April 14, 1953 P. F. M. GLOESS ET AL 2,635,229

OPERATING CIRCUITS FOR CODED ELECTRICAL SIGNALS

Filed Nov. 17, 1950 7 Sheets-Sheet 1

INVENTORS
Paul F. M. Gloess and
Francois H. Raymond
By Ralph B. Stewart
Attorney

OPERATING CIRCUITS FOR CODED ELECTRICAL SIGNALS

Filed Nov. 17, 1950 7 Sheets-Sheet 2

INVENTORS
Paul F. M. Gloess and
Francois H. Raymond
By Ralph B. Stewart
Attorney INVENTORS
Paul F. M. Gloess
Francois H. Raymond
By Ralph B. Stewart
Attorney INVENTORS
Paul F. M. Gloess
Francois H. Raymond
By Ralph B. Stewart
Attorney INVENTORS
Paul F. M. Gloess
Francois H. Raymond
By Ralph B. Stewart
Attorney INVENTORS
Paul F.M. Gloess
Francois H. Raymond
By Ralph B. Stewart
Attorney April 14, 1953 P. F. M. GLOESS ET AL 2,635,229

OPERATING CIRCUITS FOR CODED ELECTRICAL SIGNALS

Filed Nov. 17, 1950 7 Sheets-Sheet 7

INVENTORS
Paul F.M. Gloess
Francois H. Raymond
By Ralph B. Stewart
Attorney

Patented Apr. 14, 1953 2,635,229

UNITED STATES PATENT OFFICE 2,635,229

OPERATING CIRCUITS FOR CODED ELECTRICAL SIGNALS

Paul François Marie Gloess, Paris, and François Henri Raymond, Le Vesinet, France, assignors to Societe d'Electronique et d'Automatisme, Paris, France, a corporation of France Application November 17, 1950, Serial No. 196,286
In France November 23, 1949

16 Claims. (Cl. 340—167)

This invention relates to electric code operating devices, that is to say electric circuits for registering, reading, combining (e. g. by multiplication) or otherwise operating on coded electric signals, such circuits being used in such electric transmission systems as, for example, electronic computer systems.

More particularly, the invention is applicable to transmission systems of the kind (hereinafter called "the kind specified") dealing with electric signals encoded in such a manner that to each quantity or element of quantitative information there corresponds a numerical series which, expressed in the binary scale, is of the form $$a_0+a_1.2+a_2.2^2+ \ . \ . \ . \ a_p.2^p$$

wherein the coefficient $a$ in each term has either the value 0 or the value 1, depending on the value of the quantity to be represented by the code, so that for a particular quantity the series will be characterized by the presence or absence therein of terms of the orders 0, 1, 2 . . . $p$.

In practice such signals take the form of electric impulse trains of regular periodicity in which these terms are represented by individual impulses. Since the absence of a term may be represented by an impulse of zero value (i. e. by the absence of an impulse at a place of the train where an impulse would be expected in view of the regular spacing in time of the impulses), the expression "impulse place" will be employed herein to denote generically the place (or the moment of time) in the train where an impulse is due to occur, regardless of whether the impulse is of definite or of zero value, unless the context requires a distinction to be made. The periodicity of the train is defined by the time interval, herein denoted $\theta$, between successive impulse places, and the total number $n$ of impulses in any one train must not exceed the number N which represents the capacity of the transmission system embodying code operating devices according to the invention, i. e. the maximum number of impulses which such transmission system is by its design capable of dealing with.

The main object of the invention is to provide a code operating device for systems of this kind, and particularly one in which improved provision is made for registration of such coded impulse trains and for reading the train so registered, thereby reconstituting it in its original form.

A subsidiary object of the invention not necessarily achieved by all its embodiments, is to make provision for the reading of the train to be effected by any desired signal, whether it be a single impulse (representing in code the number 1, whereby reading properly speaking is effected) or another coded impulse train (representing in code any other number, whereby the reconstituted train represents the value, not of the original coded train, but of the product of multiplication of the two coded trains). Although the latter operation is not one of code reading properly so called, the expression "reading" will herein be applied thereto also, unless the context requires otherwise, code-reading proper being regarded as a particular case of code-multiplication, namely the case where the original coded train is multiplied by the value 1.

Another object of the invention, also subsidiary in the above sense, is to make provision for the code-registration and the code-reading to take place either substantially simultaneously or successively, as desired.

Another subsidiary object is to make certain supplementary provisions to enable any desired number of impulse places of negligible importance or representing terms of low orders to be suppressed from the train constituting the product of multiplication of two trains.

A further subsidiary object is to enable successive multiplication operations to be effected by reinjecting the product train into the code-operating device either as a train to be registered or as a code-reading train.

A still further subsidiary object is to make provision enabling the code-operating device to deal with coded impulse trains representing algebraic quantities, in that the first impulse place of the train indicates the minus sign by the presence therein of an impulse of definite value.

Yet another subsidiary object of the invention is to provide particular embodiments of such code-operating devices containing a comparatively small number of constituent circuits by making it possible for a single impulse distributor in the form of a delay line to be included both in the code-registering and the code-reading circuits and that irrespectively of whether these circuits are arranged for code-registration followed by reading of the code registered or for simultaneous (or, more precisely, substantially simultaneous) registration and reading.

According to the invention, a code-operating device comprises as many separate code-registering circuits as there are impulse places in a train of the highest order capable of being dealt with, a registration channel incorporating impulse distributing means for distributing the impulse places of an incoming coded impulse train, in the sequence in which the impulse places occur order by order, into the code-registering circuits so as to be impressed thereon, a code-reading channel to which is adapted to be applied a signal for reading the code impressed on the code-registering circuits, the code-reading channel incorporating impulse-distributing means similar to that in the registration channel and adapted to deliver into an output channel a coded impulse train of the same periodicity as the train registered on the code-registering circuits, and a carry-over operating circuit in the output channel for correcting any coded impulse train resulting from the reading of a registered code by means of a reading signal which is itself a coded impulse train, such resultant coded impulse train being of the same periodicity as the train registered.

By "correction" is meant the removal from an impulse place of an impulse of amplitude level equal to or exceeding the radix (of value 2 in the case of the binary scale here considered) by carrying it over to the term of the next higher order. A carry-over operating circuit for performing this carry-over operation is described for example in the specification of co-pending patent application No. 138,792, filed January 16, 1950.

According to one feature of the invention, the code-registering circuits may each comprise a bi-stable flip-flop stage, and the registration channel may comprise two input portions adapted to receive respectively the incoming coded impulse train and a registration-controlling impulse, the impulse-distributing means in the registration channel comprising a parallel group of registration transfer stages and a delay line having as many sections as there are registration transfer stages, the incoming train being applied by its input portion to all the registration transfer stages jointly, the output of each of which is applied to one of the flip-flop stages, whilst the registration-controlling impulse is applied by its input portion to the delay line, the sections of which are tapped for individual connection thereof to the registration transfer stages, namely to electrodes thereof controlling the conductivity thereof so that the registration transfer stages are individually unblocked in successive progression concurrently with the application thereto of the successive impulse places of the incoming train which are thus passed through the registration transfer stages and enabled to be registered on the flip-flop stages by affecting the condition thereof; and the impulse distributing means in the code-reading channel, in that case, comprises as many reading transfer stages as there are flip-flop stages and a delay line having as many sections as there are reading transfer stages, the code-reading signal being applied to the reading transfer stages each of which is connected to one of the flip-flop stages so as to be rendered conductive or non-conductive depending upon the condition of the associated flip-flop stage, whereby the code-reading signal, being permitted to pass through the reading transfer stages thus rendered conductive, reaches the output channel in the form of impulses distributed in time with the same periodicity as the impulse places of the incoming train and, if the code-reading signal is itself a coded impulse train, as the impulse places of the code-reading signal.

Two alternative modes of connecting the delay line in the code-reading channel may be adopted. According to the first mode each tapping of the delay line in the code-reading channel is connected to the input circuit of one of the reading transfer stages, the outputs of the latter being jointly applied to the output channel, whilst the code-reading signal is applied to the input terminal of the delay line. According to the second mode each tapping of the delay line in the code-reading channel is connected to the output circuit of one of the reading transfer stages, the code-reading signal being applied to the input circuits of all the reading transfer stages jointly, whilst the output terminal of the delay line is connected to the output channel.

In either of these modes of connection an advantageous modification may be made according to which the delay line in the code-reading circuit simultaneously serves the purpose of the delay line in the registration channel input portion receiving the registration-controlling impulse, the practical result being that the latter delay line is omitted altogether; this is achieved by the common delay line having the registration-controlling impulse applied to its input terminal and comprising a pair of tappings from each of its sections, one tapping of each pair being connected to the conductivity-controlling electrode of one of the registration transfer stages, while the other tapping of each pair is connected as set forth in the preceding paragraph. In this modification, according to a further feature of the invention, the input terminal of the device which receives the registration-controlling impulse may be directly connected to the input terminal of the common delay line, whilst the input terminal of the device which receives the code-reading signal is connected to the same input terminal of the common delay line through a delay element imposing a delay smaller than the interval between successive impulse places of the incoming train, the tappings of the common delay line which are connected to the conductivity-controlling electrodes of the registration transfer stages being also connected individually to the conductivity-controlling electrodes of the corresponding reading transfer stages, the output circuits of each of which is connected to the other tapping of the corresponding pair of tappings of the common delay line. In this arrangement, the reading transfer stages may be normally blocked and adapted to be unblocked, when required to pass a code-reading signal, by a series of recurrent unblocking impulses applied to all the reading transfer stages jointly. Alternatively, the output circuits of the reading transfer stages may be connected to their respective delay line tappings through additional transfer stages which are normally blocked and are adapted to be unblocked, when required to pass a code-reading signal, by a series of recurrent unblocking impulses applied to all additional transfer stages.

The output channel of the device may be connected, through a delay circuit, to a transfer stage having its output circuit connected to one of the input terminals of the device for reinjection of the output train of the device thereinto either as an incoming train to be registered or as a code-reading signal.

According to a further feature of the invention, each channel through which an impulse place of the incoming train is distributed from the registration channel into its associated code-registering circuit may incorporate a transfer stage adapted to be unblocked during the application to the code-registering circuits of all impulse places of the incoming train except the first impulse place so that the latter, which by the absence or presence of an impulse therein is made to represent the plus or minus sign of the quantity represented by the incoming train, is prevented from being registered, any impulse present in the first impulse place being branched off before reaching said transfer and directed into a sign-combining circuit.

Other features of the invention, being features which are not essential thereto but serve to achieve one of the subsidiary objects thereof or which may be incorporated in code operating devices embodying the invention in order to improve the design or operation of such embodiments, will become apparent hereinafter.

In order to enable the invention to be readily carried into effect, a few embodiments thereof will now be described by way of example with reference to the accompanying drawings, wherein:

Fig. 1 shows a first embodiment of an operator circuit according to the invention, without registered matter transferring means, reading being effected through the registering stages, Fig. 2 shows a second embodiment of an operator circuit according to the invention, with registered matter transferring means for reading, Fig. 3 shows an assembly making possible repeated operations, Figs. 4 and 5 show two embodiments of operator circuits according to the invention, comprising, for treating coded trains carrying algebraical values, means complementary to the means provided for treating arithmetical values, Fig. 6 shows an embodiment of an operator circuit directly designed for treating algebraical values, and Fig. 7 illustrates a control arrangement for such an operator from an auxiliary pulse source such as, for example, the timing pulse source of a computer with timed program.

Figure 1:
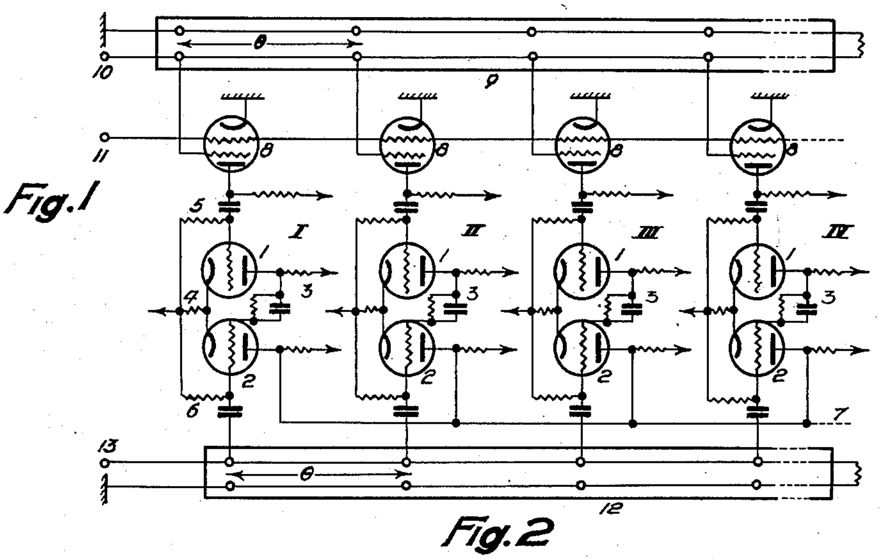

As illustrated in Fig. 1, the four flip-flop stages, I–IV make it possible to register the first four pulses of a coded train. The manner of extending this embodiment to N stages is self-evident. The stages are shown according to a known circuit, the so-called Schmidt flip-flop circuit, comprising between the tubes only a coupling from the anode of tube 1 to the grid of tube 2, by means of an RC network 3 and having a common cathode bias 4 and individual grid biases 5 and 6. Any other type of flip-flop circuit having two inputs and two stable conditions may however be used. The anodes of tubes 2 are connected, for instance, to a common outlet connection 7.

Registering is effected by modifying the equilibrium condition of these flip-flop circuits having two stable conditions, from their rest condition (such as tube 1 unblocked and tube 2 blocked) the control being obtained as follows for the embodiment of the invention:

The grids of tubes 1 of the flip-flop stages are individually connected to the anodes of tubes 8, forming transfer stages, normally blocked in the absence of a control voltage and which are unblocked at the timing of any train to be registered by applying to their screen grids, for instance, or suppressor grids, impulses from a distributor advantageously comprising, as shown, a delaying line 9, the inter-tap intervals of which are equal to $\theta$, interval between instants of a train, at which line there is applied at 10 one single pulse at the same time at which begins the application of a coded train to the transfer stages 8, the coded train being applied on the control grids of tubes 8 in parallel from terminal 11. Therefore, at the instant at which the first pulse of the train (assumed to be present) is applied to these transfer stages 8, the distributing pulse flowing in line 9 is applied to the tap corresponding to the first tube 8, this tube alone in all transfer tubes is unblocked and the train pulse can only be applied to the control grid of tube 1 of the first flip-flop stage I, the equilibrium condition of which is reversed (tube 1 blocked, tube 2 unblocked). If no first pulse of the train exist, no transfer tube 8 will operate a flip-flop circuit. At the next following time $\theta$, it is clear that the distributing pulse will have reached the second tap on line 9, and consequently the second of tubes 8 will transmit to the flip-flop circuit II the next pulse of the coded train, if any is effectively present, and so on.

In usual cases, the distributing pulse is provided from the programme circuit of the machine or the system incorporating such a register. If there are no programme pulses, in the usual sense of the term, there will then exist a pilot pulse, associated with the incoming train and preceding it, which imperatively will be made different from the train pulses, in time or wave form, which makes possible selecting it in order to route it to line 9 with a desirable delay, generally equal to $\theta$, so that such a pilot pulse most frequently presents, as well known in pulse code transmission systems, the time interval $\theta$ with reference to the first instant of the train.

Reading of the registered matter advantageously occurs, as illustrated in Fig. 1, through the tubes 2 of the flip-flop stages. It is accordingly well known that in flip-flop stages with two inputs, any pulse having an amplitude less than a certain critical amplitude level (that critical level which causes the change of condition) will only be amplified if applied to an unblocked tube, and will remain without effect if applied to a blocked tube. At 12 is shown the reading pulse distributor, advantageously consisting in a delaying line, similar to line 9, to the input terminal 13 of which is applied a single reading pulse, for restoring the registered matter in the form of a coded train, or a coded reading train for restoring or establishing an output train representing the product of the multiplication of the two codes. As registering and reading are effected through distributors having uniform transit characteristics, at uniform timing, it is clear that the arrangement set forth provides for simultaneously reading and registering. Accordingly, if the instants of application of the coded train to be registered to terminal 11, and of the reading pulse (or pulse train) to terminal 13 are the same (with a tolerance equal to the "change-over" time of a flip-flop stage) said condition is obtained. Whether the reading and registering be simultaneous, or not, a coded train with timing $\theta$ will appear at the common output lead 7 of the flip-flop devices and this train will reproduce either the registered matter, or the value of an unrectified product of the two codes, viz.: the registering code and the reading code.

In order that the pulses of the output train correctly reproduce the numerical value in its binary development, it is necessary that the unblocked tubes assume the registering of the said value (tubes 2 conducting at the operated condition of the flip-flop devices). If this condition was the reverse, for instance, tube 1 being blocked and tube 2 unblocked at rest, it would then be necessary to modify the form of the output train by cancelling the existing pulses in the said train and inserting in it pulses at every place where they were needed. This may be obtained in either of two different manners; that is, either by opposing the output train to an uninterrupted succession of similarly timed pulses, according to a method well known per se, or by "negatively" registering the entering coded train, that is by performing this operation at the input to the register. Moreover, reading might be performed through tubes 1 of the flip-flop stages. However, to avoid such complications, it is proposed to transfer the condition of the flip-flop stages to separate reading transfer stages, and such a circuit arrangement is diagrammatically shown in Fig. 2.

Figure 2:
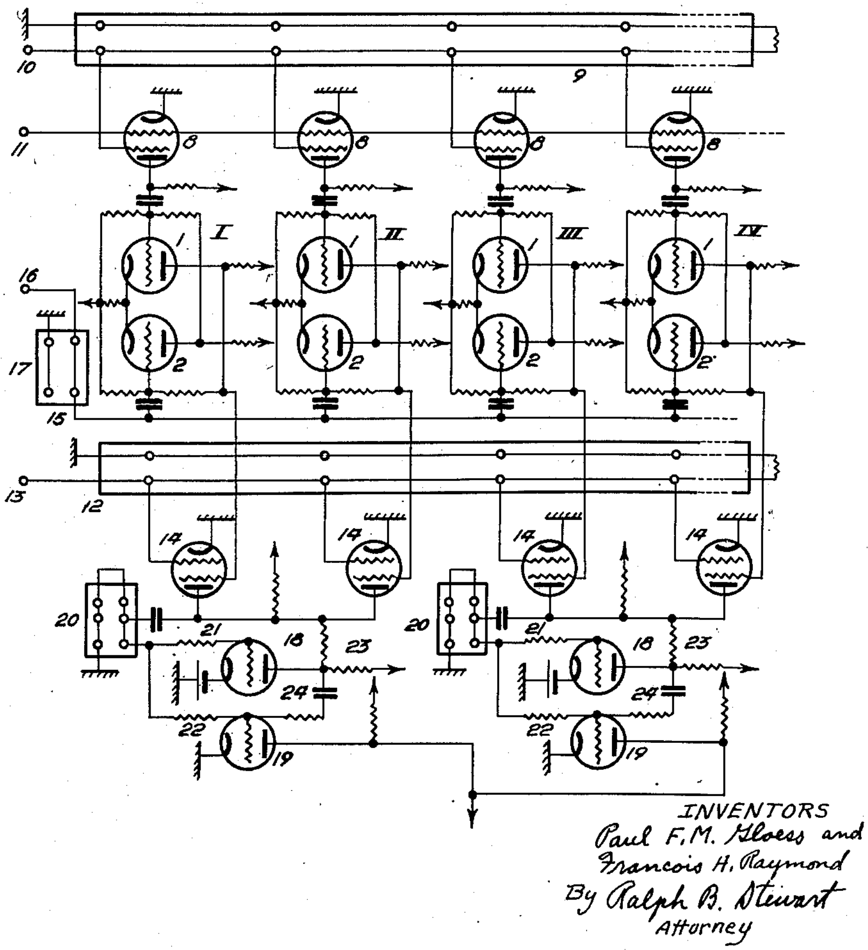

In Fig. 2, the flip-flop stages (the circuit of which is illustrated as a symmetrical circuit, having however two separate control inputs) have the anodes of one of their tubes (here tube 1 which is assumed to be unblocked in the rest condition), individually connected to screens or suppressors of tubes 14 the control grids of which are individually connected to the output taps of reading distributing line 12. In this manner, whenever one of flip-flop stages I, II, . . ., has had its equilibrium condition altered by registering one pulse of the coded train entering at 11, such a stage immediately unblocks the corresponding tube 14 and if a reading pulse reaches the control grid of this tube, through the corresponding tap on line 12, the said pulse will be transmitted to the anode circuit of the tube 14 without any reaction possibly occurring between reading and registering, whether these operations are, or are not, simultaneous.

It was found that, in the case of a multiplication of two codes, the train resulting from reading carried only the "rough" result of the multiplication, that is to say, the pulses of output train may have amplitude levels higher than unity. Consequently there must be provided a rectification by operation of the carry-over quantities, which may be made by means of any carry-over operator circuit connected to the output of the above-described register. Such circuits have been described, for instance, in copending application Serial No. 138,792, filed January 16, 1950. There is illustrated in Fig. 2 the beginning of a series-parallel combination of such an operator obtained by associating elementary operators according to the above-cited application, each operator only treating the unit level and double unit level of incoming pulses. For such purpose, the output channels of tubes 14 are paired and each pair acts on an elementary carry-over operator. The elementary carry-over operators themselves have paired outputs, and so on.

Each one of two elementary carry-over operators shown comprises an analyzer for levels higher than unity (operating here for levels double, or treble of unity), consisting in the threshold stage 18 and an output stage 19. The pulses delivered by tubes 14 are delayed and then reversed by means of delaying line 20 (delay time $\theta$ then directed through resistor 21 to tube 18 and through resistor 22 to tube 19). If the amplitude of a pulse presents at the output of line 20 a level higher than unity, tube 18 delivers an anode pulse which, with unity amplitude, such as defined by resistor 23, is added to the next following input pulse and with doubled amplitude; such as defined by resistor 24, is subtracted from the pulse then applied to tube 19, bringing it to zero level or back to unity level. The polarity reversal due to the assembly of delaying line 20 and tube 18 automatically insures the above cited conditions of addition or subtraction. If the incoming pulse already has a level equal to 2, the said level is brought to a level equal to 3 when a unit carry operation occurs. Such a circuit and its operation requires no detailed description, as they are well known per se, as above stated.

The resetting to zero of the flip-flop stages, in order to cancel the registered matter, is obtained by applying in parallel on all the grids of tubes 2 a pulse from common outlet 15 of delay circuit 17 having an input terminal 16. This pulse may, for instance, be derived from the output of either line 9 or 12 by a connection to terminal 16. The pulse is delayed at 17 by a time at least equal to the registering or reading time.

Both the latter arrangements may evidently be applied to the operator diagram shown in Fig. 1.

An operator such as described makes it possible, if desired, to execute repeated multiplications if a re-injection circuit is provided for the outgoing train. Such a completed operator is diagrammatically shown in Fig. 3, in which reference 25 stands for the above described assembly up to the three last elementary carry operators 26, 27 and 28. At the output of 28, and possibly after a polarity reversal (not shown and comprising a reversing stage, if necessary), the following circuit is provided a delaying line 35, the traverse time of which is (N—P)$\theta$, P$\theta$ being the delay caused by succession of elementary carry-over operators, if this delay is zero (such as in certain carry-over operator circuits set forth in the above-mentioned application) it receives the train resulting from the multiplication. The duration of this train is generally longer than N$\theta$ and it may reach 2N$\theta$ or double the maximum duration tolerable in the computer or the transmission system incorporating a registering device such as described. The output of delaying line 35 is applied to a tube 29, connected as a pulse regenerator, that is, tube 29 is normally receiving at another grid through terminal 30 an uninterrupted succession of timing pulses delivered by the programme and simultaneously insuring a duration and timing regeneration by means of the pulses of the said succession and by a clipping operation obtained, for instance, between cathode and control grid. As well known, such a stage is blocked in the absence of regenerating pulses. The output of this tube is divided at 31, one branch going to the pick-up stage 32 (also controlled by means of a succession of pulses applied through terminal 33 to a further one of its grids) and delivering the resulting train, when it is desired to pick it up, by applying pulses 33 to channel 34, the other branch extending through a further delaying line 36, with transit time Nθ, terminating in a further pulse regenerating stage 37, delivering the trains which flow through it, under the control of timing pulses applied at 38, to channel 39 which performs the reinjection of the trains either at terminal 11 or at terminal 13 as desired. Thus, even if a train resulting from any multiplication but limited to the N last instants, may be picked up on channel 34 by tube 32, this train, being complete, may be reinjected into one of the input channels of the operator, as the whole transit time of the loop, is 2Nθ. When this reinjection is undesired, the application of the pulses at terminal 38 is stopped. Likewise, so long as it is not desired to pick up an output train, terminal 33 is left without pulses, these conditions being, of course, insured from the programme member.

It may also be seen that the code operating device embodying the re-injection means according to the invention then makes it possible to directly raise to any desired power any number represented by a coded train.

A code operator according to the arrangements set forth, devised to treat coded trains of order N carrying arithmetical values, may be employed to treat, coded trains of like overall order carrying algebraical values, that is trains which include an additional pulse, at the beginning of the train, to define the minus sign, this place being left with no pulse to define the plus sign. This may be accomplished, according to the present invention, by using either one of the circuit arrangements diagrammatically shown in Figs. 4 and 5 in connection with the code operator. In both arrangements the sign pulse, at the input, is separated from the significant pulses of the body of the train and is introduced into the multiplying circuit, then a resulting sign pulse representing the resultant sign of the multiplication is reinjected into the output train at the suitable place or time.

The input terminals for the coded trains are shown at 41 and 43 and these terminals are only connected to the input terminals 11 and 13, respectively, of the multiplier through tubes 44 and 45, which by means of one of their grids are blocked at the times 0 of the incoming trains at which the above cited sign pulses may exist, by means of a signal applied to terminals 40 and 42 (said signal consisting in, or being derived from, the first pulse of each recurrent succession of timing pulses of the programme or of a pilot signal, as above-mentioned). The body pulses of the train flow then freely through tubes 44 and 45.

All the pulses of the two trains which arrive simultaneously are applied, through channels 46 and 47, onto tubes 48 and 49 respectively. These tubes are arranged as a pulse coincidence detecting circuit, such as well known in the art of ionisation counters. This circuit, sometimes called a plate bottoming circuit may be summarized as follows: the two pentode tubes 48 and 49 are provided with a common plate resistance, of a low value, and operate on the lower knee of their anode current characteristic when no signal is applied to them. When a negative going signal is applied to a tube, the said tube operation is brought to the cut-off point of its characteristic, whereas the other tube remains on the lower portion of its curve and, consequently, no pulse is delivered at their common output. When both tubes simultaneously receive a signal, their operating points are both brought to the cut-off point on their characteristics and, consequently, a common anode pulse appears, with a level the absolute value of which exceeds the level of the input pulses.

A network of mixing resistances 50, 51 and 52 connected in the input conductors 46 and 47 and in the common output conductor of the tubes 48, 49 respectively, ensures that when coincidence of impulses takes place no pulse of actuating level is applied to the control grid of a tube 53 connected to the network of mixing resistances, whereas such an actuating impulse is applied whenever no such coincidence of impulses exists in the conductors 46 and 47. In the latter case the actuating impulse after amplification in the tube 53 is applied to the input grid of a stage 54 which delivers a corresponding impulse when unblocked. The stage 54 however is blocked during the occurrence of the impulse places from θ to Nθ of the incoming trains, and is unblocked only during the first or sign-denoting impulse places of the incoming trains, this being done by an impulse applied via a terminal 55 to another grid of the tube 54. The impulses of the two incoming trains applied at 41 and 43 respectively will always coincide except in the one case where one train represents a positive and the other a negative quantity, when the sign-denoting impulse places alone will not have coincident impulses, and only in that case will the tubes 53 and 54 be actuated. Thus the tube 54 selects the impulse denoting the minus sign whenever it ought to appear in the product train as the result of multiplication of the signs of the incoming coded trains.

Figure 3:
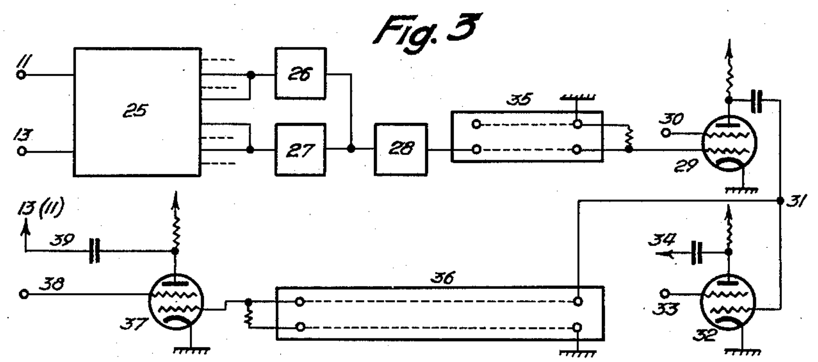
Figure 4:
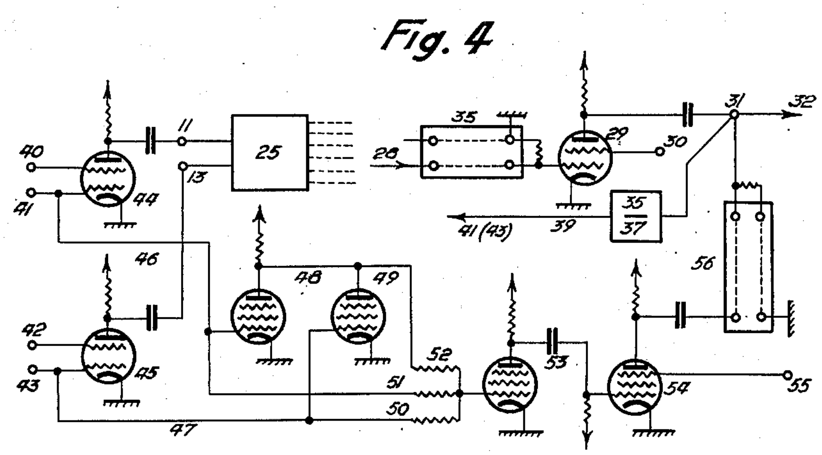

The impulse denoting the minus sign (when there is one) must be reattached to the outgoing product train. For this purpose, the arrangements of Figs. 3 and 4 are shown associated with the re-injection circuit shown in Fig. 3, the sign-denoting impulse being applied from the plate of the tube 54 to the junction 31 after being retarded in a delay line 56 so as to be correctly positioned in time in the outgoing product train. If the code operating device operates without re-injection of the product train into its input terminals, the tube 37 being blocked, and if the outgoing product train is drawn off at 32 after suppression of the first N impulse places of the train, the delay line 56 should have a transmission time of electrical length equal to $(p+N-1)\theta$. If the device operates with re-injection of the product train, the latter retaining its full duration, the delay line 56 should be of the same electrical length, but its output terminal should be connected to the output circuits of the tube 32 (Fig. 3) whereas a tapping distant Nθ from the input terminal of the delay line 56 should be connected to the junction 46.

However the said delaying line 56 becomes purposeless in cases where the trains to be multiplied are permanently available at terminals 41 and 43 as, in all cases, the resulting sign-denoting pulse must be picked up at instants at which the sign pulses of incoming trains always appear at these terminals.

Most commonly, however, there will be no ground for a limitation to the simultaneous and recurrent insertion of two trains into multiplying circuit 25. The resultant sign-denoting pulse must consequently be registered and stored for a variable period of time and such registering may advantageously be effected in a flip-flop stage, either at the output of tube 54, or, and preferably, by the means shown in Fig. 5.

In this figure, channels 46 and 47 excite tubes 57 and 58 which, by means of a further grid, are so controlled that they only pass the first pulse (the sign pulse) of each incoming train, a blocking signal being applied to these grids from terminals 59 and 60 after the appearance of the sign-denoting pulse, i. e. from time $\theta$ to time $N\theta$. The outputs of tubes 57 and 58 excite in common, but of course at different times, both inputs of a flip-flop stage 63. One of the outputs of the said flip-flop stage is so connected to one grid of a tube 64 that the said tube is blocked if both pulses were applied to the flip-flop stage (thus brought back to its rest condition) and that the said tube is unblocked if only one pulse was applied to it, the flip-flop stage being in the operated condition. Thus a reading pulse applied at 65 at the desired time controls tube 64 to apply a pulse at 31 and thereby effect the restoration of the sign-denoting pulse at its correct place in the output train. This circuit may be generalized in an evident manner: if a number of coded trains carrying algebraical values are to be multiplied in succession, and if these trains are introduced successively, the sign pulses are separated and, at each further insertion, the circuit described checks if the sign of the result is to be modified, by a change of the condition of stage 63. It is clear, in fact, that any even pulse number brings back the flip-flop stage to its rest condition, whereas any odd number will leave it in operated condition.

Figure 6:
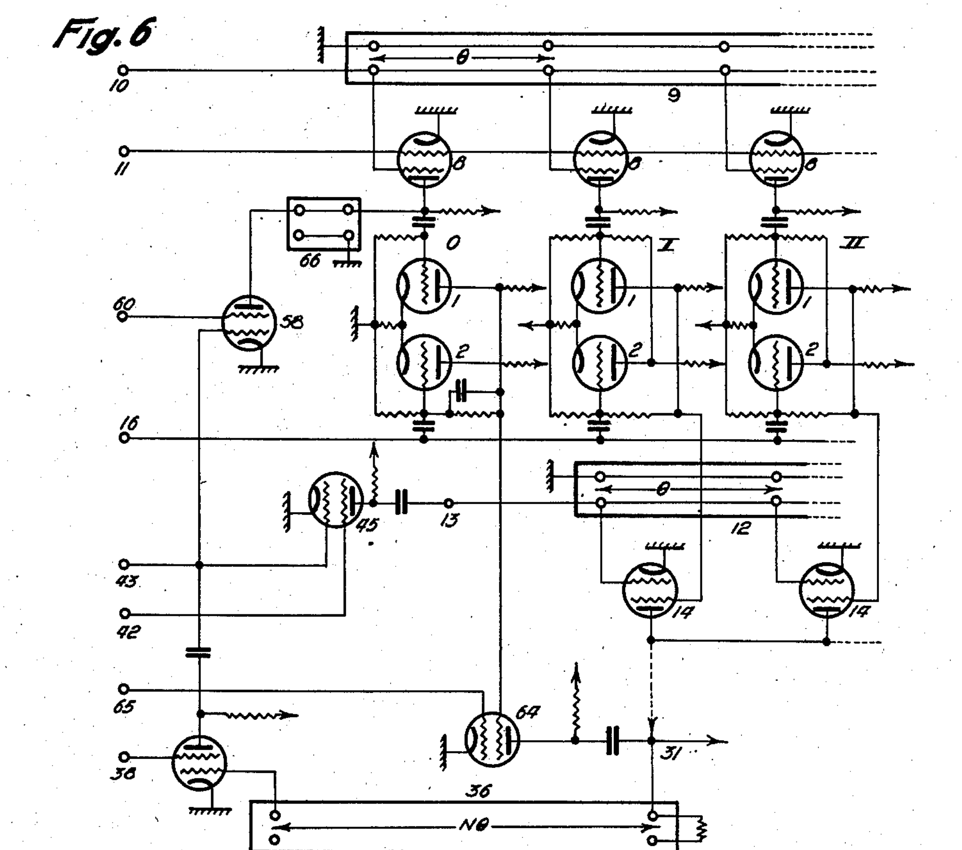

If now the transmission system was primarily designed to treat algebraical values, or in other words if the various component circuits were directly designed to have a capacity corresponding to trains the maximum order of which is $N+1$, with the first pulse instant reserved to the sign pulse, then a code operator circuit according to the invention will be advantageously of the form diagrammatically shown in Fig. 6.

In Fig. 6, delaying line 9, which is used to register by distributing the registering pulses on tubes 8 to which the pulses of the incoming coded train are applied in common, is provided with a first additional section which, in association with an additional tube 8, excites a flip-flop stage 0, the function of which is to register the sign indication. Due to the process set forth in relation to Figs. 1 and 2, this stage 0 alone can receive and register the pulse possibly existing at the first instant of the incoming coded train applied at 11.

Figure 5:
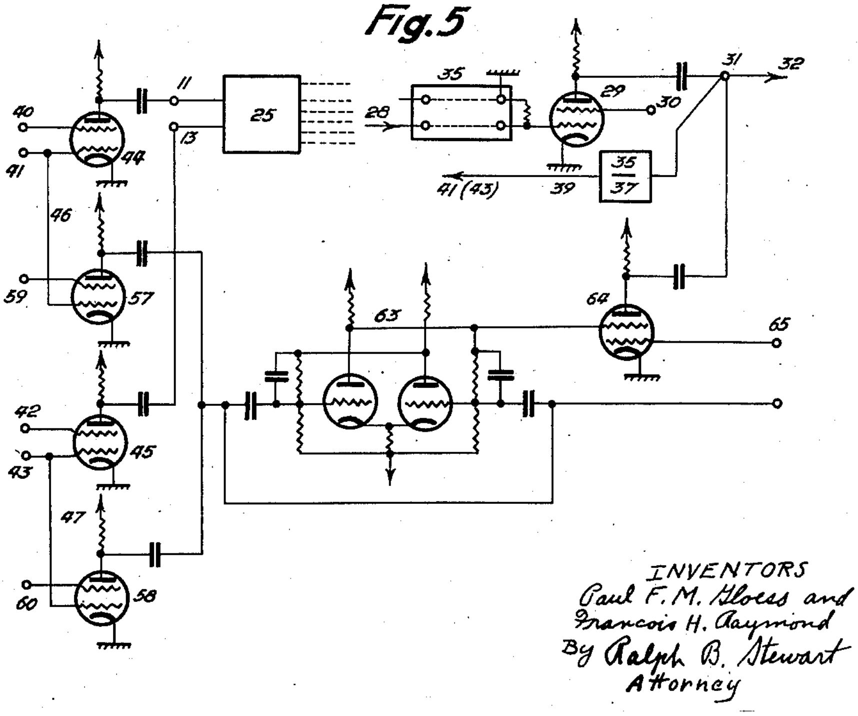

The condition of this flip-flop stage 0 controls the conduction condition of a tube 64, in the same manner in which flip-flop stage 63 controls such a tube in Fig. 5. When this tube 64 receives, at the suitable instant, a reading pulse applied on its control grid from terminal 65, it thus transmits, or does not transmit, a sign-denoting pulse to output 31, depending upon whether tube 64 is conducting or not.

The condition of flip-flop stage 0 must also be subject to the control of the possible sign pulse of the coded reading train, whereas the said pulse must not be transmitted to line 12. This is obtained by providing an input circuit such as shown in Fig. 5, for applying the reacting train to terminal 13. In this circuit embodied in Figure 6 the elements corresponding to those of the circuit shown in Fig. 5 are marked by the same reference numbers. However, in order that flip-flop device 0 may operate correctly, even if the coded registering and reading trains are simultaneously applied (whereas the circuit of Fig. 5 only operates if the trains are successively applied), a delay is introduced at 66 in the path leading from the output of tube 58 to the input terminal of flip-flop device 0, which delay may have any desired duration shorter than the time defined with reference to Fig. 4 for line 56 (reinjection operator) or than $p\theta$ (operator without reinjection) and if $p=0$, shorter than $\theta/4$ or other fraction of $\theta$ making possible to then insure a correct retiming of the sign pulse, by a later regeneration of the train pulses. Of course, flip-flop device 0 must be provided with such a type of circuit that it operates whenever a pulse is applied to it, always at the same terminal, whichever be the condition of the flip-flop stage at the instant of appearance of the pulse. Such is the illustrated circuit, which, besides, is in accordance with an embodiment described in application Serial No. 175,809, filed July 25, 1950.

Figure 7:
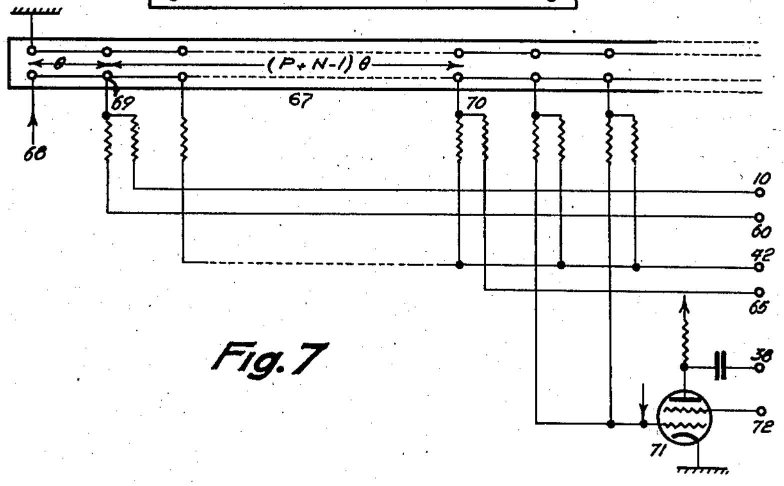

It was hereabove indicated that the control pulses necessary for controlling the code operators just described are most generally delivered either by the programme circuit of the machine incorporating the said operators, or by a pilot pulse preceding by $\theta$ the coded train. Fig. 7 illustrates the manner in which these control pulses may be issued from a single pulse delivered by the said programme circuit, or consisting in the said pilot signal. A delaying line 67 is excited at 68 by the said pulse, and, following a first section, with transit time $\theta$, the tap 69 of the line is connected to terminals 10 and 60, at the time at which the possible sign pulses are appearing, the N following taps of the line are connected to terminal 42, and tap 70, located a distance of $(p+N-1)\ \theta$ from terminal 69 is additionally connected to terminal 65, this being in the case of an operator without reinjection. For a reinjection operator, all taps (2 N in number) counted from 70 are connected to terminal 38 through a switching stage 71, operated at terminal 72 by a reinjection controlled pilot signal delivered from the programme circuit. In the latter case, tap 70 which excites terminal 65 is located a distance of $(N-1)\ \theta$ from terminal 69.

Generally speaking, an operator circuit such as just described comprises as many distinct register circuits as there are instants in the trains of maximum order to be treated, and arrangement for distributing the pulses of the said instants, in proper order, on the said register circuits, as these pulses appear in the pulse trains. It also includes a reading channel for the registering circuits, the said channel comprising a distributing arrangement of the same character as the pulse distributing arrangement, and an output channel for the coded train resulting from the reading, the latter channel incorporating a mixing arrangement, followed by rectification at amplitude level, and by a carry-over circuit for correcting pulses resulting from the reading.

Figure 8:
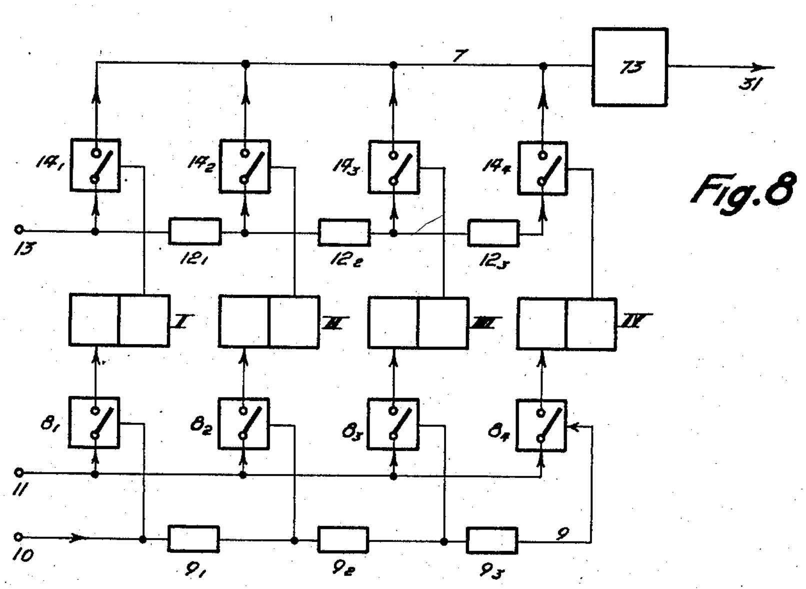
Figs. 8 and 9 show, in conventional representation, the two typical arrangements of operator circuits according to the present invention.

More particularly such an operator circuit is diagrammatically illustrated in Fig. 8, which reproduces in a simplified form, an arrangement according to those shown in detail in Figs. 1 and 2. In Fig. 8 there are again found, from I to IV, the independent double stability flip-flop stages forming the registerers proper, this limitation to four stages being, of course, used only to simplify the drawings. There is found again at 9 the artificial delaying line which, in connection with transfer stages 8, forms the arrangement distributing the pulses of the incoming coded train applied at 11, or multiplicand train, due to the fact that, through input 10, the said line assumes the progression from one stage to the next following one, of a registering pulse, at the same timing as the instants of the coded train to be registered. There is also again the reading arrangement which, by applying the reading train or pulse at terminal 13 to artificial line 12, assures the generation of the coded output train by transferring the said reading pulse, or any existing pulse of the coded reading train, through each one of transfer stages 14 which was unblocked by the corresponding registering flip-flop stage I to IV, if brought by the registered matter to a proper condition. The outputs of these stages 14 are connected to the common output channel 7, which extends through a carry-over operator circuit of any suitable type (which needs not be specified here, its specific structure being not concerned in the invention), in such a manner that, at the output 31 of the said carry-over operator 71, there appears a coded train, with correctly presented amplitude levels, carrying the net result of the multiplication of the code registered in the flip-flop stages and by the coded reading train, or multiplier train, applied at 13 (unit coded train if one single pulse is applied at the reading instant, to the said terminal). Stages 14 may be omitted or, more precisely, embodied in one of the paired tubes of flip-flop devices I to IV.

It may be observed that, in such an arrangement, the portion relating only to reading (from terminal 13 to carry-over operator 73, exclusively) forms in itself a coder such as defined in the French patent application Serial No. 567,873 filed by the present applicant on February 17, 1949, for "Operator Circuits for Electrical Signalling Systems Comprising Coded Pulse Trains." Now the operation of these coders is reversible, in the sense that, by interchanging the connexions of the display stages 14 of the multiplicand, reading may be performed by means of an incoming signal in channel 7, as any pulse of this signal entering parallel stages 14 and flowing through the whole or part of them, reaches a tap on delaying line 12, which insures a correct mixing, at their instants, of the pulses of the product train thus obtained, in such a manner that the said train, in its rough form, will appear at terminal 13, then considered as a coder output terminal. Of course, in such a case, the carry-over operator 73 must be shifted to the said terminal 13.

Figure 9:
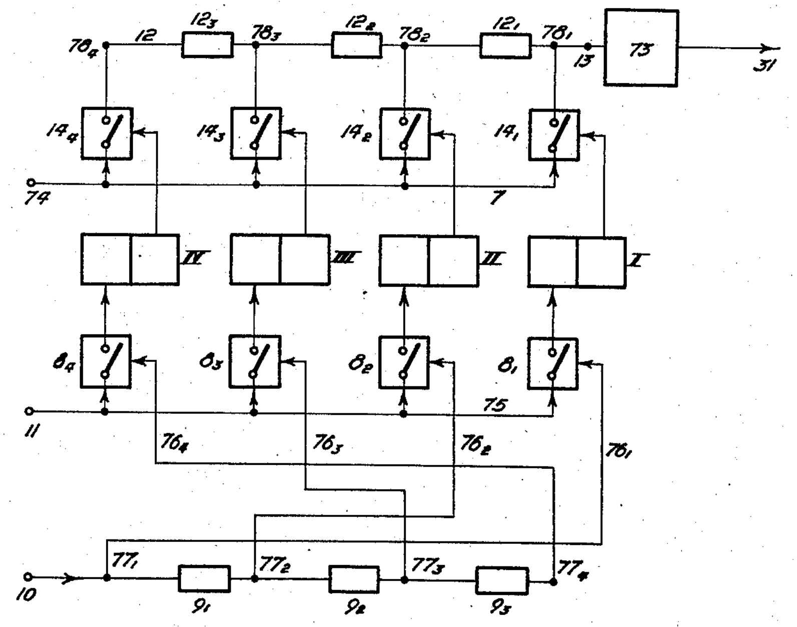

To make good use of this reversible operation in operator circuits of the type thus described, there is provided according to the invention, and as illustrated in Fig. 9, a circuit arrangement in which, on the one hand, stages 74 are excited through a common lead 7 at terminal 14 and have their output connected to the successive taps on delaying line 12, the output terminal of which then serves as a circuit output terminal and in which, moreover, the general direction of control connexions of the registering arrangement is reversed, in order to avoid a reversing of the transmitting direction of the coded train resulting from the reading operation with reference to the transmitting direction of the instants of the multiplicand and multiplicator trains. This is clearly shown by the reversal of the reference numeral retained for the corresponding elements from Fig. 8 to Fig. 9.

Two points must be noted in considering the arrangement of Fig. 9. The first one is the symmetrical excitation of the corresponding transfer stages 8 and 14′ all the pulses of the train to be registered, applied at terminal 11 in common channel 75 to stages 8, appear in parallel at the said stages, and all the pulses of the coded reading train, applied at terminal 74 in common channel 7, appear in parallel at stages 14. Secondly the relative transit directions of lines 9 and 12 by the respective registering and reading pulses are, in fact, reverse, while they are identical in the arrangement according to Fig. 8. However, as diagrammatically shown, this direction may arbitrarily remain the same by crossing or reversing the successive unblocking connections of stages $8_1$ to $8_4$ from the respective taps of delaying line 9. These connections are numbered $76_1$ to $76_4$. The taps on line 9, regularly spaced at intervals equal to the timing intervals between successive instants of the incoming coded train, are numbered $77_1$ to $77_4$, and the taps on line 12 to which the outputs of stages $14_1$ to $14_4$ lead, are numbered $78_1$ to $78_4$.

These considerations being taken into account, a further object of the present invention consists in providing certain modifications of operator circuits tending to insure a better economy of means used for their embodiment, particularly by doing away with delaying line 9 and transferring its function to delaying line 12, then at a later stage, and more particularly to insure the possibility of nearly simultaneous registering and reading, by suppressing common channel 7 for applying the multiplier train and distributing the pulses of this train by means of delaying line 12, thus accomplishing a three-fold function.

These latter improvements will now be described in detail with relation to the diagrams illustrated in Figs. 10 and 11, in a general form, and in Figs. 12 to 15 in various electronic embodiments. However, to limit the extent of this description, there will only be considered now the case of operators designed according to the circuit shown in Fig. 9, the transposition to operators designed according to the diagram of Fig. 8 being obvious to one skilled in the art.

Figure 10:
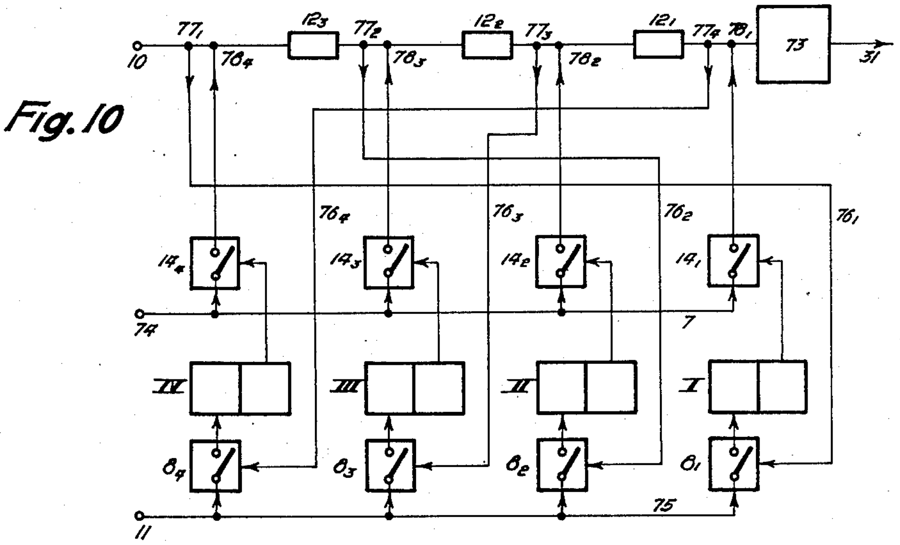
Fig. 10 is another form of Fig. 2, in which a single distributing line is provided for registering an incoming coded train and for distributing in time the elements of signals coming from the reading operation.

As illustrated in Fig. 10, terminal 10 for applying the registering pulse is applied to the input of delaying line 12 and, in the said line are provided the taps 77 for progressively unblocking transfer stages 8 through crossed connections 76. Such an operator operates in two steps: a first step for registering and a second step for reading (or multiplying). It is clear that any overlap of one step on the other causes a truncated product.

For example, if the multiplicator train were applied at 74 substantially simultaneously with the application of the multiplicand train at 11 and with that of the registration-controlling impulse at 10, then, though jumbling of the product train with the registration-controlling impulse can be avoided by appropriate staggering in time of these two signals, the first impulse place of the multiplicator train could only combine with the first impulse place of the multiplicand train registered on the stage I; similarly the second impulse place of the multiplicator train could combine only with the first two impulse places of the multiplicand train, and so forth. In order that a coded train representing such a truncated product may still be of some practical use, it is necessary that either the multiplicand or the multiplicator train should arrive with the impulse places representing the highest orders at its head, whereas the other should arrive with the impulse places representing the lowest orders at its head. This would give a small error in the product train, but it may be useful in calculating systems in which it is required to obtain product trains of a maximum duration not exceeding the duration of N impulse places of the individual trains to be combined, even though this entails errors in the lower orders.

However, even with the use of a single impulse-distributing delay line, simultaneous (or more correctly, substantially simultaneous) registration and code-reading operations may be achieved without error by applying the multiplicator train not directly to all the reading transfer stages 14 jointly as shown in Fig. 10, but at intervals by distributing its impulse places in time, prior to being applied to the stages 14, at the same periodicity as the registration-controlling impulse. This in effect constitutes a partial return to the arrangement of Fig. 8, so that Fig. 11 which shows such a modification of Fig. 10 as just outlined may be considered as being derived either from the arrangement of Fig. 8 or from that of Fig. 9.

Figure 11:
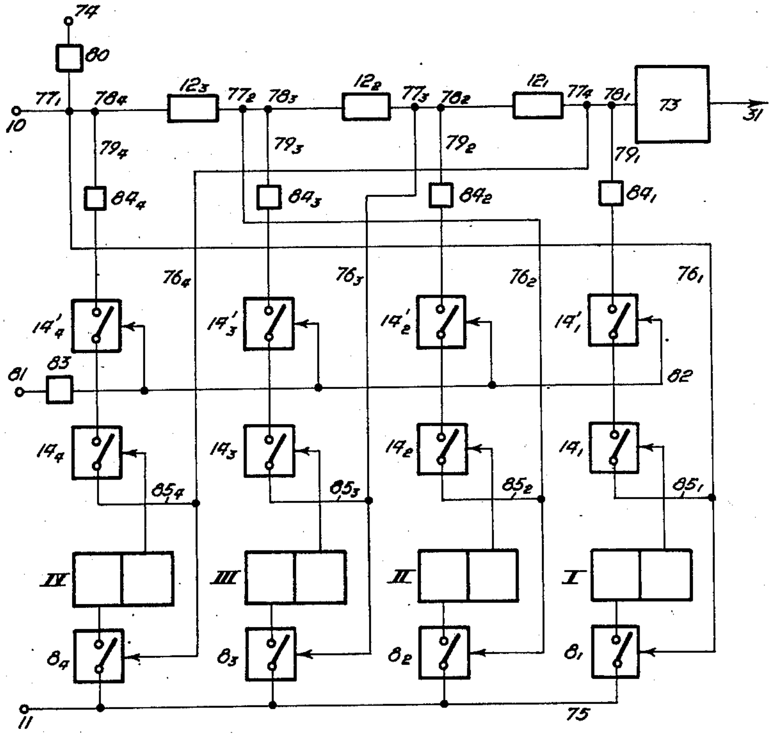
Fig. 11 is another embodiment of Fig. 10, in which the same said single distributing line also serves for introducing the reading signal.

As shown in Fig. 11, the terminal 7 for introducing the multiplicator train is now situated at the input end of the delay line 12, a delay element 80 however being interposed between the terminal 74 and the delay line 12. The delay effected by the delay element 80 is in all cases less than the time interval between succeeding impulse places of the trains at the given periodicity, the lower limit of the delay being however never less than the time necessary for ensuring the proper "changing over" of the flip-flop stages I to IV, and the latter must not be less than the effective duration of an impulse place of the multiplicand train. Thus, any impulse place of the multiplicator train, although it is applied to the registration transfer stages 8 as well as to the reading transfer stages 14 respectively by the connections $76_1$ to $76_4$ and by branch connections $85_1$ to $85_4$ therefrom, cannot coincide with the application to the stages 8 of the impulse place of the multiplicand train and so cannot cause any untimely change in the registration of the latter because the unblocking of the transfer stages 8 by the impulse places of the multiplicator train is of no effect in the absence of signals to be registered.

In the arrangement of Fig. 11, any registration-controlling impulse travelling in the delay line 12 is applied not only to the registration transfer stages 8 for unblocking them consecutively, but also to the reading transfer stages 14 on which it has the effect of an unwanted code-reading impulse. Various means may be adopted for avoiding this effect. For example, and this appears to be the most direct method, the reading transfer stages 14 may be normally blocked (even when acted upon by a voltage from the flip-flop stages) and adapted to be unblocked at the proper code-reading instants by an uninterrupted series of unblocking impulses which are of the same periodicity as the impulse places of the multiplicator and multiplicand trains and in phase with those of the multiplicator train. Alternatively the stages may be allowed to be permanently conductive but arranged to have either their input or their output circuits blocked by additional means, such as electronic switches, the latter being in turn controlled by the aforesaid series of unblocking impulses. As a further and obvious alternative, the stages 14 or their input or output circuits may be normally unblocked, except at the instants of application of the registration-controlling impulse, the blocking being effected by an uninterrupted series of impulses which in that case however are in phase with the impulse places of the multiplicand train.

In the arrangement shown in Fig. 11, there has been chosen by way of example the case in which electronic switches 14′ are interposed in the output circuits of the reading transfer stages 14, the switches 14′ being normally blocked and adapted to be unblocked by the auxiliary or clock impulses of the aforesaid uninterrupted series which are in phase with the impulse places of the multiplicator train and are applied by a conductor 82 of the conductivity-controlling electrodes of all the switches 14′ jointly. The variants enumerated above can readily be deduced from the arrangement shown. The clock impulses are applied to the terminal 81 of the common conductor 82, and are first retarded in a delay element 83 by the same amount as the impulse places of the multiplicator train are retarded in the delay element 80.

Finally it must be noted that if no other precaution were taken, the train which would leave the device at 31 would not represent the true product of multiplication of the two trains entering at 11 and 74, but the sum of this product and of the multiplicator train, since the impulse places of the multiplicator train applied at 74 would coincide with those of the product train delivered by the output circuits of the switches 14′. This is avoided by providing delay elements $84_1$ to $84_4$ which retard the output signals of the switches 14′, before they are introduced into the delay line 12, by an amount sufficient to ensure that the impulse places of the product train and those of the multiplicator train appearing in the output channel 31 are staggered in time so that the equipment connected to the output channel can be made to select the product train alone for onward transmission, for example, by an impulse regenerator circuit unblocked only at the periodic instants of arrival of the impulse places of the product train. The delay imposed by the delay elements 84 is determined by taking into consideration, for its lower limit, the duration of an impulse at the output end of the delay line 12. The staggering of the product train and multiplicator train is moreover necessary for another reason, namely to avoid the impulse places of the product train passing into the conductors 76 in such a manner as to interfere with the registration and code-reading operations at 8 and 14; this underlines the advantage of the method whereby the stages 14 or their input or output circuits are normally blocked except at the required instants, because otherwise it would be necessary to use a second series of blocking impulses staggered or phase-displaced by a different amount.

The staggering of the signals in the delay line 12 will in practice never be prohibitively long, for it is usual when the delay line is considered too long and/or likely to introduce too great an attenuation of the impulses travelling through it, to interpose stages for regenerating the impulses both in duration and amplitude between sections or groups of sections of the delay line (in the present case, for example, between the sections $12_3$, $12_2$, and $12_1$).

In actual practice the delay elements 84 will not be separate elements but will be formed by portions of the impulse-distributing delay line 12 itself (with the exception conceivably of the element $84_4$ at the end of the line) by simple staggering of the tappings 78 with respect to the tappings 77. For additional certainty of operation, provision may be made if necessary to ensure by suitable circuit design that the functioning of the transfer stages 8 and 14 is such that the registration-controlling impulses and the impulses of the multiplicator train are of opposite polarity to those of the product train; this may be effected by using polarity-inverting stages.

Figs. 12 to 15 are given to better illustrate practical arrangements for the diagrams of Figs. 9 to 11, Fig. 12 corresponding to Fig. 9, Fig. 13 to Fig. 10, and Figs. 14 and 15 to two modifications of Fig. 11.

Figure 12:
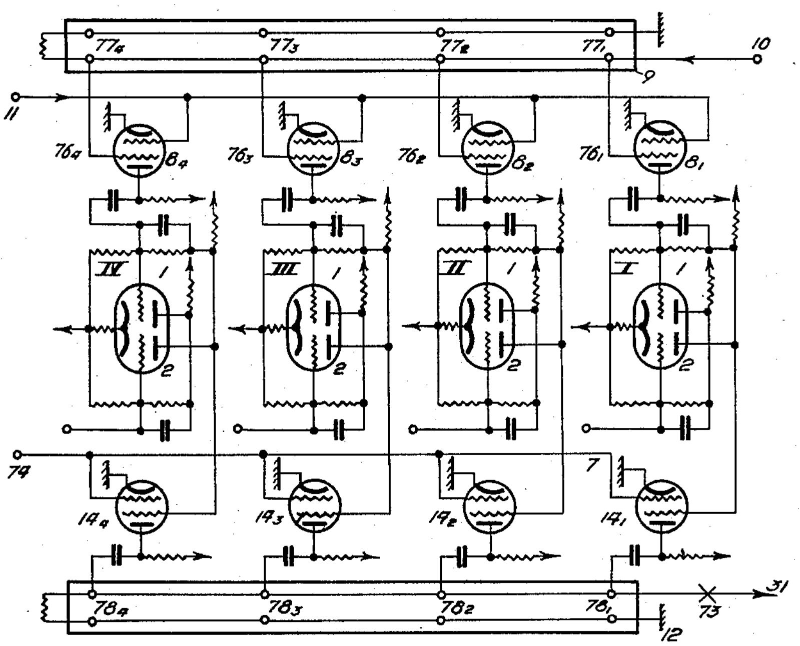
Figs. 12 and 13 are two practical embodiments of Fig. 9.

It may be seen on Fig. 12 that the various taps 77 of artificial delaying line 9, excited at 10 by means of a registering pulse, are connected to a screen grid, or suppressor, or more generally to any second grid of any respective tube forming transfer stages 8, while the multiplicand input channel 11 is connected in parallel to all the control grids of these tubes. Tubes 8 are normally blocked in the absence of the application of a registering pulse, but they are successively unblocked as the said pulse is forwarded in line 9 and reaches taps 77. Consequently, gradually and with the timing of the multiplicand, which equals the timing of appearances of the registering pulse at successive taps 77, each pulse present in the multiplicand train is transferred to the corresponding stage I to IV and changes the condition of the said stage. Once a condition of a flip-flop device has thus been changed or maintained (in the absence of a pulse at this instant in the train) this flip-flop device cannot be operated by a further pulse, in the same way that it was not operated by any pulse prior to its input channel unblocking instant.

This results from each flip-flop stage being designed according to any symmetrical well known circuit in which the two tubes 1 and 2 are paired by mutual grid-anode coupling, so that it has two different stable conditions, depending upon which of its tubes is unblocked, the other tube always being in the reverse condition. A general return of all flip-flop stages to the rest condition must be performed once the operation is over, for instance, as described, by applying a resetting pulse at terminals 16 to the control grids of tubes 2 (assuming that the actuation of the registering has been performed by excitation of the control grid of tubes I).

The change of condition of a flip-flop stage of this type (or any well known equivalent type) results in a variation of the anode voltage, in practice from full voltage to zero, or the reverse, of its tubes. This characteristic potential variation of one condition of the flip-flop device is made use of, for example, by pick-up on the plates of tubes 2, to unblock the corresponding tubes 14 in one condition of the flip-flop devices and to block them in the other condition. Consequently, tubes 14 receive on a second grid the said output voltages of the flip-flop devices, while in the reading step their control grids are excited in parallel by the signal applied at 74 to common channel 7. The anode outputs of tubes 14 are respectively connected to the corresponding taps 78 of delaying line 12 for time distributing of the pulses produced at each instant of reading.

Figure 13:
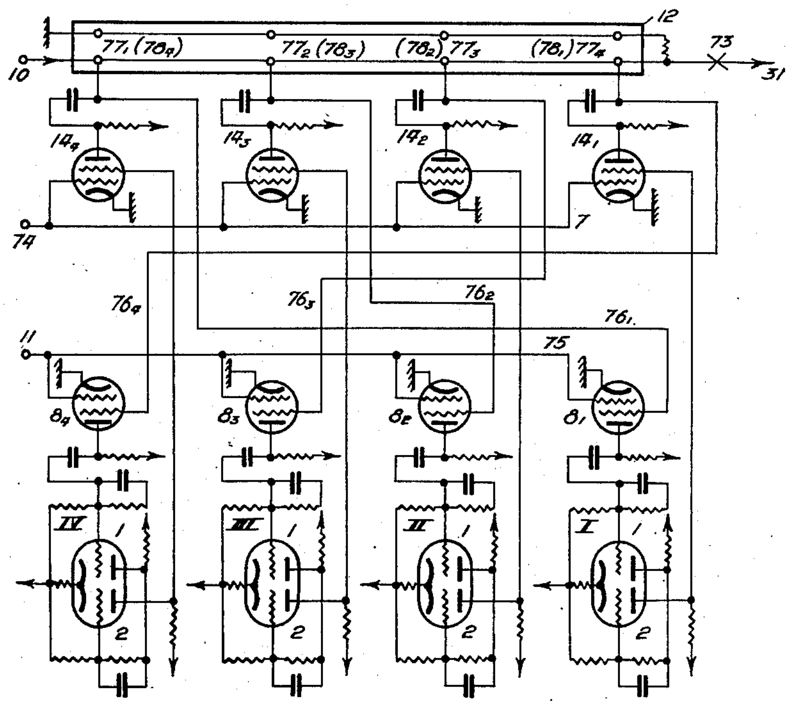

The same elements are found again in the diagram shown in Fig. 13. However, delaying line 12 serves as set forth to perform the time distribution of the multiplicand registering pulse applied at its input 10. Crossing of connections 76 is to be preferred to introducing the registering pulse in the inverse transit direction of line 12 because, in practice, an artificial line is only compensated, with reference to attenuation, in one direction of the propagation of signals through the said line.

Figure 14:
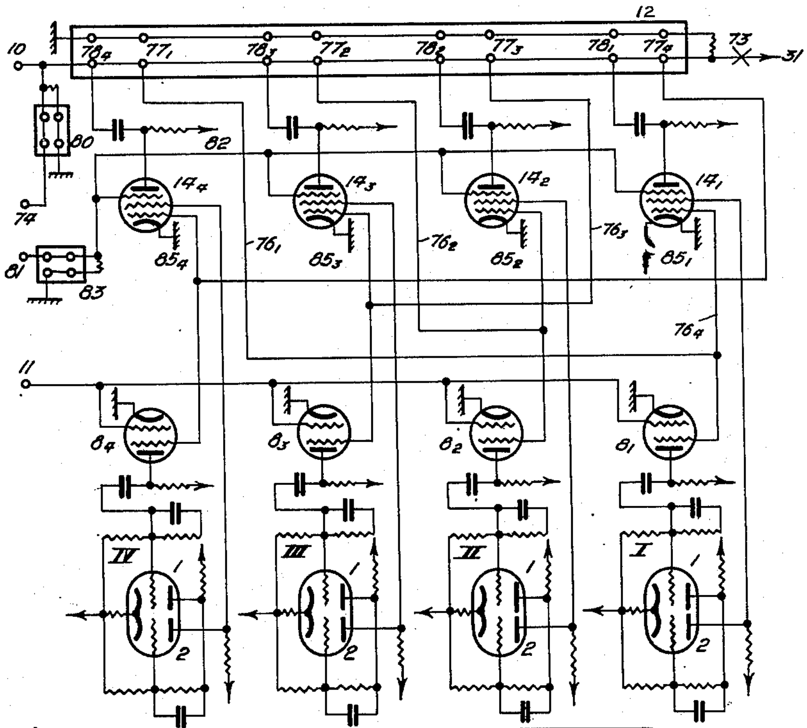
Fig. 14 is a practical embodiment of Fig. 10.

In Fig. 14 the general arrangement of the diagram of Fig. 4 is repeated, in which the registering pulse and the multiplier train are both introduced into delaying line 12, with a delay at 80 of the multiplier train with reference to the registering pulse, that is with reference to the multiplicand train. Stages 14 then comprise pentode tubes, the suppressor electrode of which receives from 81, in order to momentarily unblock them, a succession of recurring pulses with the timing of the instants of the trains in phase with the instants of the application to their control grid of the multiplier pulses through branches 85, the unblocking pulses being delayed at 83 by an interval equal to delay 80 plus delay 78—77.

As above mentioned, this is due to taps 78 being shifted back with reference to corresponding taps 77, so that the product pulses appear in the output channel 31 after the multiplier train pulses (and, of course after the registering pulse).

Figure 15:
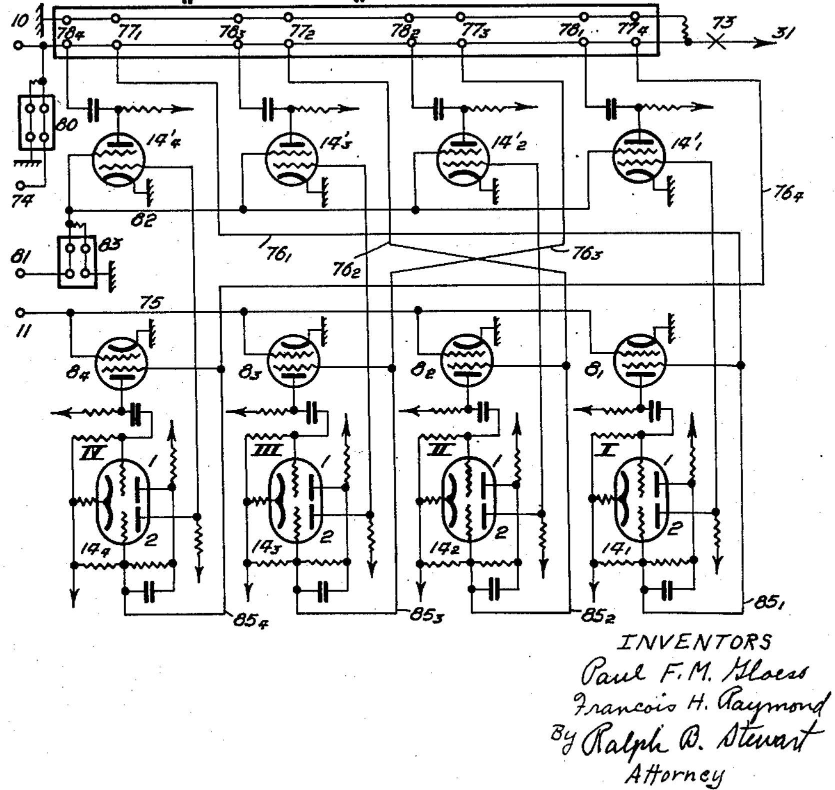
Fig. 15 is a practical embodiment of Fig. 9.

Fig. 15 shows a further modified embodiment of the arrangement shown in Fig. 11 in cases where the flip-flop devices I to IV are chosen of the symmetrical coupling type, although with double stable conditions which, as set forth in the beginning of this specification, makes it possible to consider their tubes 2 as fulfilling the function of the omitted stages 14, the said tubes 2 when unblocked acting as amplifiers for signals applied to their grids, provided that these signals remain at an amplitude well under an operating level fixed by adjustment of the flip-flop stage. This is the reason for which in Fig. 15, branches 85 excite the control grids of the said tubes 2.

However, as it would be inconvenient to effect the blocking of tubes 2 at the instants of the application of the registering pulse and of the product pulses, in case the product pulses are of such polarity that they could effect change-over of the flip-flop stages, stages 14' are inserted between the outputs of tubes 2 and taps 78. These switch 14' are normally blocked and are only unblocked at suitable instants by means of a second grid, from a succession of auxiliary pulses of the type described, applied at 82.

While the invention has been described and illustrated in a few embodiments only, it is to be well understood that many further modifications may be made within the scope of the following claims.

In the appended claims the term "transfer gate" is used to refer to the transfer stages embodied in the registering and reading channels, preferably in the form of grid-controlled electron tubes as shown and described.

What we claim is:

1. An electric code operating device for electric transmission systems dealing with electric signals in the form of electric impulse trains of regular periodicity comprising: a plurality of bi-stable flip-flop stages equal in number to the number of impulse places in a train of the highest order to be dealt with, said flip-flop stages acting as code-registering circuits; a registration channel for registering upon said flip-flop stages the impulses of an incoming coded impulse train, said channel comprising a delay line with means for applying a registration impulse to one end thereof, a plurality of transfer gates, one for each flip-flop stage, and having their inputs connected in parallel to an input terminal for an incoming coded impulse train and their outputs connected to individual flip-flop stages, and connections from spaced points on said delay line to said transfer gates to render said gates conductive in succession by said registration impulse; an output circuit; and a reading channel for effecting transfer of pulses from said flip-flop stages to said output circuit comprising, a plurality of reading transfer gates each connected to be controlled by an individual flip-flop stage, said means for controlling all of said reading gates by a reading signal to effect transfer of pulses to said output circuit according to the joint control of said reading gates by said registered code and said reading signal, said reading channel also including a delay line for effecting time distribution of the pulses applied to said output circuit with the same timing as said incoming train.

2. A code operating device according to claim 1 wherein said registration and reading channels are provided with separate delay lines.

3. A code operating device according to claim 1 wherein said reading channel is provided with a separate delay line from the registration channel, the control inputs of said reading gates being connected at spaced points along said reading delay line and their outputs being connected in parallel to said output circuit, and including means for applying said reading signal to one end of said reading delay line.

4. A code operating device according to claim 1 wherein said reading channel is provided with a separate delay line having one end thereof connected to said output circuit and having the outputs of said reading gates connected at spaced points thereon, the control inputs of said reading gates being connected in parallel to a common terminal for said reading signal.

5. A code operating device according to claim 1 wherein said delay line embodied in said registration channel also constitutes the delay line in said reading channel, said output circuit being connected to the opposite end of said delay line from the end receiving said registration impulse.

6. A code operating device according to claim 5 wherein the control circuits of said reading gates are connected to said delay line at spaced points along the length thereof but in reverse order with respect to the connections of said registration gates along said line.

7. A code operating device according to claim 5 wherein the outputs of said reading gates are connected to the same points on said delay line as said transfer gates, but in reverse order along the length of said line with respect to the connections to said transfer gates.

8. A code operating device according to claim 7 and including a delay device for applying said reading signal to the same end of said delay line receiving said registration impulse.

9. A code operating device according to claim 1 wherein said delay line embodied in said registration channel also constitutes the delay line in said reading channel, said output circuit being connected to the opposite end of said delay line from the end receiving said registration impulse, the outputs of said reading gates being connected to said delay line at equally spaced points along the length thereof, said points being spaced equally from the points of connection of the transfer gates in said registration channel.

10. A device according to claim 9 wherein the separation between the points of connection of said reading gates and the points of connection of said transfer gates has an electrical length of less than the interval between successive impulse places of the incoming train.

11. A code operating device according to claim 1 and including a connection having delay means therein for supplying pulses from said output circuit to said input terminal for the coded input train.

12. A code operating device according to claim 1 and including a connection having delay means therein for supplying pulses from said output circuit to the input terminal of said reading channel.

13. A code operating device according to claim 1 and including a resetting circuit connected to one of the actuating members of each flip-flop stage for simultaneously applying a resetting signal to all of said flip-flop stages.

14. A code operating device according to claim 1 and including a sign-combining circuit, and means included in both of said channels for preventing the entry into said channels of the first impulse place of any incoming train and of any reading signals formed of a coded train, and for diverting said first impulse place into said sign-combining circuit.

15. An electric code operating device according to claim 1 wherein said reading signal is formed of a coded impulse train, and including a carry-over operator embodied in said output circuit for correcting the pulse train resulting from the action of said reading signal.

16. An electric code operating device for electric transmission systems dealing with electric signals in the form of electric impulse trains of regular periodicity comprising a plurality of separate code-registering circuits equal in number to the number of impulse places in a train of the highest order to de dealt with; a registration channel including impulse distributing means for distributing the impulses of an incoming coded impulse train in the sequence in which the impulses occur in the impulse places, order by order, into said code-registering circuits, said code impulses being impressed onto the corresponding code-registering circuits; an output channel; a code reading channel for reading the code impressed onto said code-registering circuits, said reading channel including impulse distributing means similar to said impulse distributing means in said registration channel and controlled by a reading signal for delivering to said output channel a coded impulse train of the same periodicity as said train registered on the code-registering circuits, and means for applying to said reading channel a reading signal formed of a coded impulse train; and a carry-over operating circuit in said output channel for correcting the pulse train resulting from the action of said reading signal.

PAUL FRANÇOIS MARIE GLOESS.
FRANÇOIS HENRI RAYMOND.

References Cited in the file of this patent

UNITED STATES PATENTS

| Number | Name | Date |
|---|---|---|
| 2,429,228 | Herbst | Oct. 21, 1947 |
| 2,456,825 | Fitch et al. | Dec. 21, 1948 |
| 2,577,141 | Mauchly et al. | Dec. 4, 1951 |

FOREIGN PATENTS

| Number | Country | Date |
|---|---|---|
| 613,084 | Great Britain | Nov. 22, 1948 |